(12) United States Patent
Shin

(10) Patent No.: US 12,444,753 B2
(45) Date of Patent: Oct. 14, 2025

(54) NANOWIRE CATALYST FOR FUEL CELL AND METHOD OF MANUFACTURING SAME

(71) Applicants: HYUNDAI MOTOR COMPANY, Seoul (KR); KIA CORPORATION, Seoul (KR)

(72) Inventor: Dong Yoon Shin, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/664,614

(22) Filed: May 15, 2024

(65) Prior Publication Data

US 2024/0297312 A1    Sep. 5, 2024

Related U.S. Application Data

(62) Division of application No. 17/547,609, filed on Dec. 10, 2021, now Pat. No. 12,015,160.

(30) Foreign Application Priority Data

Jun. 23, 2021 (KR) .................. 10-2021-0081234

(51) Int. Cl.
*H01M 4/92* (2006.01)
*H01M 4/86* (2006.01)
*H01M 4/88* (2006.01)
*H01M 4/90* (2006.01)

(52) U.S. Cl.
CPC ....... *H01M 4/8885* (2013.01); *H01M 4/8605* (2013.01); *H01M 4/8882* (2013.01); *H01M 4/9041* (2013.01); *H01M 4/92* (2013.01); *H01M 4/926* (2013.01)

(58) Field of Classification Search
None
See application file for complete search history.

(56) References Cited

U.S. PATENT DOCUMENTS

| | | | |
|---|---|---|---|
| 10,056,622 B2 * | 8/2018 | Kim | ................ C23F 1/40 |
| 2014/0093790 A1 | 4/2014 | Liu et al. | |
| 2020/0099079 A1 | 3/2020 | Dellinger et al. | |
| 2020/0353719 A1 | 11/2020 | Pintauro | |

FOREIGN PATENT DOCUMENTS

| | | | | |
|---|---|---|---|---|
| CN | 105789648 | * | 7/2016 | |
| KR | 10-1818817 B1 | | 1/2018 | |
| KR | 10-1857593 B1 | | 5/2018 | |
| WO | WO-2013123137 A1 | * | 8/2013 | ........... B22F 1/062 |
| WO | WO-2015061383 A1 | * | 4/2015 | ........... H01M 4/86 |

* cited by examiner

*Primary Examiner* — Jonathan Crepeau
(74) *Attorney, Agent, or Firm* — MCDONNELL BOEHNEN HULBERT & BERGHOFF LLP

(57) ABSTRACT

A nanowire catalyst for a fuel cell has a porous structure in which first and second pores having predetermined pore sizes are uniformly dispersed inside and on the surface thereof at a predetermined volume ratio. This enables the efficient exposure of active sites and efficient mass transfer, thereby improving fuel cell performance.

3 Claims, No Drawings

NANOWIRE CATALYST FOR FUEL CELL AND METHOD OF MANUFACTURING SAME

CROSS REFERENCE TO RELATED APPLICATIONS

The present application is a Divisional of U.S. patent application Ser. No. 17/547,609, filed Dec. 10, 2021, which claims priority to Korean Patent Application No. 10-2021-0081234, filed on Jun. 23, 2021. The entire disclosure contents of these applications are herewith incorporated by reference into the present application

BACKGROUND

Field

The present disclosure relates to a nanowire catalyst for a fuel cell, the nanowire catalyst having a porous structure in which pores having different sizes are uniformly dispersed inside and on the surface thereof, and a method of manufacturing the same.

Description of the Related Art

Platinum nanowire catalysts have been used as fuel cell catalysts having a one-dimensional structure.

However, given the characteristics of a fuel cell reaction in which the reaction occurs mainly on the surface of a catalyst, a typical platinum nanowire catalyst has a smooth surface which hinders the exposure of active sites and mass transfer.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the specific objective is as follows.

An objective of the present disclosure is to provide a nanowire catalyst for a fuel cell, the nanowire catalyst having a porous structure in which first and second pores having different sizes are uniformly dispersed inside and on the surface thereof, and a method of manufacturing the same.

Objectives of the present disclosure are not limited to those mentioned above. The objectives of the present disclosure will become clearer from the following description, and will be realized by means and combinations thereof described in the claims.

In order to achieve the above objective, according to one aspect of the present disclosure, there is provided a nanowire catalyst for a fuel cell, the nanowire catalyst including a catalytic metal, and having a porous structure in which first and second pores having different pore sizes are uniformly dispersed inside and on a surface thereof, wherein the first pores may have a larger pore size than the second pores, and the first pores may account for 10% to 30% by volume and the second pores may account for 70% to 90% by volume with respect to the total volume of the pores.

The catalytic metal may include at least one selected from the group consisting of platinum (Pt), palladium (Pd), gold (Au), silver (Ag), and iridium (Ir).

The first pores may have a pore size of 7 nm to 10 nm.

The second pores may have a pore size of 2 nm to 6 nm.

The nanowire catalyst may have a nanowire diameter of 15 nm to 150 nm.

According to another aspect of the present disclosure, there is provided a method of manufacturing a nanowire catalyst for a fuel cell, the method including preparing a first mixture by mixing a first polymer precursor and a first metal precursor in a first solvent, preparing a second mixture by adding a second polymer precursor to the first mixture, electrospinning the second mixture, and heat-treating a resultant product resulting from the electrospinning.

The first solvent may include at least one selected from the group consisting of ethanol (EtOH), dimethylformamide (DMF), propanol (PrOH), methanol (MeOH), trifluoroacetic acid (TFA), dichloromethane (DCM), and dimethylacetamide (DMAc).

The first metal precursor may include at least one selected from the group consisting of a platinum salt, a palladium salt, a gold salt, a silver salt, and an iridium salt.

The first polymer precursor may include at least one selected from the group consisting of polyvinylpyrrolidone (PVP), polyacrylonitrile (PAN), polycaprolactone (PCL), polylactic acid (PLA), polyimide (PI), and polyurea (PU).

The second polymer precursor may be a polymer having a lower pyrolysis temperature than the first polymer precursor.

The second polymer precursor may be included in a content of 10% to 20% by weight with respect to the total weight of the polymer precursors.

The heat-treating of the resultant product resulting from the electrospinning may include subjecting the resultant product resulting from the electrospinning to a primary heat treatment for pyrolysis, and subjecting a resultant product resulting from the pyrolysis to a secondary heat treatment for carbonization in a reducing atmosphere.

The primary heat treatment may be performed at a temperature of 550° C. to 650° C. in an air atmosphere.

The secondary heat treatment may be performed at a temperature of 200° C. to 300° C. in the reducing atmosphere.

The method may further include adding a second metal precursor during the preparing of the first mixture, and performing acid treatment after the heat-treating of the resultant product resulting from the electrospinning is performed.

The second metal precursor may be a metal salt having a lower density than a first metal and being soluble in acid.

The second metal precursor may be mixed in a content that is four to five times a content of the first metal precursor.

The method may further include adding a second solvent during the preparing of the first mixture, wherein second pores may be formed during the electrospinning of the second mixture.

The second solvent may have a lower volatilization temperature than the first solvent.

The second solvent may be included in a content of 10% to 25% by weight with respect to the total weight of the solvents.

The nanowire catalyst for the fuel cell, according to the present disclosure, has a porous structure in which first and second pores having predetermined pore sizes are uniformly dispersed inside and on the surface thereof in a predetermined volume ratio. This enables the efficient exposure of active sites and efficient mass transfer, thereby improving fuel cell performance.

Effects of the present disclosure are not limited to those mentioned above. It should be understood that the effects of the present disclosure include all effects that can be inferred from the following description.

DETAILED DESCRIPTION

The above and other objectives, features, and other advantages of the present disclosure will become apparent with reference to the following description of exemplary embodiments. However, the present disclosure is not limited to exemplary embodiments disclosed herein but will be implemented in various forms. The exemplary embodiments are provided by way of example only so that a person of ordinary skill in the art can fully understand the disclosures of the present disclosure and the scope of the present disclosure.

Like reference numerals refer to like components throughout the drawings. In the drawings, dimensions of structures are exaggerated for clarity. It will be understood that, although the terms first, second, etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element. As used herein, the singular forms are intended to include the plural forms as well, unless the context clearly indicates otherwise.

It will be understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof. It will be further understood that when an element such as a layer, a film, a region, or a substrate is referred to as being "on" another element, it can be directly on the other element or intervening elements may also be present. In contrast, it will be understood that when an element such as a layer, a film, a region, or a substrate is referred to as being "under" another element, it can be directly under the other element or intervening elements may also be present.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about". Where a numerical range is disclosed herein such range is continuous, inclusive of both the minimum and maximum values of the range as well as every value between such minimum and maximum values. Still further, where a range refers to integers, every integer between the minimum and maximum values of such range is included.

In this specification, where a range is stated for a parameter it will be understood that the parameter includes all values within the stated range, inclusive of the stated endpoints of the range. For example, a range of "5 to 10" will be understood to include the values 5, 6, 7, 8, 9, and 10 as well as any sub-range within the stated range, such as to include the sub-range of 6 to 10, 7 to 10, 6 to 9, 7 to 9, etc, and inclusive of any value and range between the integers which is reasonable in the context of the range stated, such as 5.5, 6.5, 7.5, 5.5 to 8.5 and 6.5 to 9, etc. For example, a range of "10% to 30%" will be understood to include the values 10%, 11%, 12%, 13%, etc and all integers up to 30% as well as any sub-range within the stated range, such as to include the sub-range of 10% to 15%, 12% to 18%, 20% to 30%, etc, and inclusive of any value and range between the integers which is reasonable in the context of the range stated, such as 10.5%, 15.5%, 25.5%, etc.

In the case of a typical platinum nanowire catalyst having a smooth surface, this characteristic hinders the exposure of active sites and mass transfer. Therefore, the use thereof becomes problematic when applied to a fuel cell.

Accordingly, as a result of having conducted an intensive study to solve the above problems, the present inventors have found that, in the case of a fuel cell nanowire catalyst having a porous structure in which first and second pores having predetermined pore sizes are uniformly dispersed inside and on the surface thereof at a predetermined volume ratio, it is possible to enable the efficient exposure of active sites and efficient mass transfer, thereby improving fuel cell performance, and completed the present disclosure.

A nanowire catalyst for a fuel cell according to the present disclosure includes a catalytic metal and has a porous structure in which first pores and second pores having different pore sizes are uniformly dispersed inside and on the surface thereof. The first pores are configured to have a larger pore size than the second pores. The first pores account for 10% to 30% by volume, and the second pores account for 70% to 90% by volume with respect to the total volume of the pores.

The nanowire catalyst for the fuel cell according to the present disclosure may have a nanowire diameter of 15 nm to 150 nm, preferably, 20 nm to 60 nm. When the diameter is too small, it is difficult to form the first pores in the catalyst, which hinders mass transfer, and the catalyst is vulnerable to flooding. On the other hand, when the diameter is too large, mass transfer is hindered and the active area of platinum is relatively reduced.

The catalytic metal included in the nanowire catalyst for the fuel cell may include a catalyst that can accelerate the reaction of an electrode in the fuel cell, e.g., at least one selected from the group consisting of platinum (Pt), palladium (Pd), gold (Au), silver (Ag), and iridium (Ir). Of these, preferred is platinum (Pt) having the best activity for oxygen reduction reaction as a cathode catalyst.

The pores included in the nanowire catalyst for the fuel cell includes the first pores and the second pores having different pore sizes. The pores having different pore sizes are evenly dispersed inside and on the surface of the catalyst, thereby enabling the efficient exposure of the active sites where the reaction of the catalytic metal occurs, resulting in efficient mass transfer. In particular, varying the pore size makes it possible to increase the activity of the catalyst itself by increasing the active area and active sites of the catalyst structure as well as increasing mass transfer.

Specifically, the pore size of the first pores may be equal to or less than 10 nm, preferably, 7 nm to 10 nm. When the pore size of the first pores is too small, it is difficult to increase mass transfer. On the other hand, when the size thereof is too large, the active area is reduced.

In addition, the pore size of the second pores may be 2 nm to 6 nm, preferably, 2 nm to 4 nm. When the pore size of the second pores is too small, the pores are blocked by an ionomer and fail to play their role. On the other hand, when the pore size of the second pores is too large, the active area is reduced.

The volume ratio of the first pores and the second pores having different pore sizes may be such that the first pores account for 10% to 30% by volume and the second pores account for 70% to 90% by volume with respect to the total volume of the pores. When the volume ratio of the first pores is too low, it is difficult to increase mass transfer. On the other hand, when the volume ratio thereof is too high, the active area is reduced.

That is, since the nanowire catalyst for the fuel cell according to the present disclosure has a porous structure in which the first and second pores having predetermined pore sizes are uniformly dispersed inside and on the surface thereof at a predetermined volume ratio, it is possible to enable the efficient exposure of active sites and efficient mass transfer, thereby improving fuel cell performance.

A method of producing a nanowire catalyst for a fuel cell according to the present disclosure satisfying the above characteristics includes the steps of preparing a first mixture by mixing a first polymer precursor and a first metal precursor in a first solvent, adding a second polymer precursor to the first mixture to prepare a second mixture, electrospinning the second mixture, and heat-treating a resultant product resulting from the electrospinning.

However, specific steps or additional components may be further included depending on the order of forming first pores and second pores.

Specifically, a method of producing a nanowire catalyst for a fuel cell according to the present disclosure in order to form first pores and then form second pores includes the steps of: preparing a first mixture by mixing a first polymer precursor, a first metal precursor, and a second metal precursor in a first solvent, adding a second polymer precursor to the first mixture to prepare a second mixture, electrospinning the second mixture, and heat-treating a resultant product resulting from the electrospinning, and performing acid treatment.

In the step of preparing the first mixture, the first mixture may be fundamentally prepared by mixing the first polymer precursor and the first metal precursor in the first solvent. Preferably, the second metal precursor is further added thereto in order to form the first pores before the second pores.

The first solvent may include a solvent having a characteristic of well mixing the first polymer precursor and the second polymer precursor, e.g., at least one selected from the group consisting of ethanol (EtOH), dimethylformamide (DMF), propanol (PrOH), methanol (MeOH), trifluoroacetic acid (TFA), dichloromethane (DCM), and dimethylacetamide (DMAc), but is not limited to including only a specific solvent.

The first polymer precursor may include a polymer that can be carbonized to carbon through heat treatment, e.g., at least one selected from the group consisting of polyvinylpyrrolidone (PVP), polyacrylonitrile (PAN), polycaprolactone (PCL), polylactic acid (PLA), polyimide (PI), and polyurea (PU), but is not limited to including only a specific polymer.

The first metal precursor may include a precursor that can become a catalytic metal through the manufacturing process, e.g., at least one selected from the group consisting of a platinum salt, a palladium salt, a gold salt, a silver salt, and an iridium salt. Of these, preferred is a platinum salt that can be made from platinum. Specifically, the platinum salt may include at least one selected from the group consisting of tetrachloroplatinic acid ($H_2PtCl_4$), hexachloroplatinic acid ($H_2PtCl_6$), potassium tetrachloroplatinate ($K_2PtCl_4$), potassium hexachloroplatinate ($K_2PtCl_6$), dinitrodiamine platinum ($Pt(NO_2)_2(NH_3)_2$), and hexahydroxyplatinic acid ($H_2Pt(OH)_6$).

In addition, the second metal precursor may include a precursor that can form the second pores through acid treatment after the first pores are formed through heat treatment, preferably, a metal salt that is well soluble in acid among metal salts having a lower density than a first metal that can be made from the first metal precursor, e.g., at least one selected from the group consisting of a cobalt salt, a nickel salt, an iron salt, a copper salt, a tin salt, and a palladium salt, but is not limited to including only a specific salt.

In this case, when preparing the first mixture, the second metal precursor is mixed in a content that is preferably equal to or less than five times the content of the first metal precursor, and more preferably four to five times. When the content of the second metal precursor is less than the above range, a second metal to be formed is formed in the center and is difficult to remove during acid treatment. On the other hand, when the content thereof exceeds the above range, it is difficult to control the pore size of the second pores due to aggregation between the same metals.

In the step of preparing the second mixture, the second mixture is prepared by adding the second polymer precursor to the prepared first mixture.

The second polymer precursor is a polymer that can be pyrolyzed in the subsequent heat treatment step, and is preferably a precursor having a lower pyrolysis temperature than the first polymer precursor. For example, the second polymer precursor may include polymethyl methacrylate (PMMA), but is not limited to including only a specific polymer precursor.

The second polymer precursor may be included in a content of 10% to 20% by weight, preferably 10% to 15% by weight with respect to the total weight of the polymer precursors. When the content of the second polymer precursor is too small, it is difficult to obtain uniform pores. On the other hand, when the content thereof is too large, a nanowire structure is not maintained.

In the step of electrospinning the second mixture, the prepared second mixture is electrospun to produce a nanowire catalyst precursor in a nanofiber form.

Specifically, "electrospinning", which is employed as a method for producing the nanowire catalyst precursor in a nanofiber form in the present disclosure, refers to a spinning technique for producing nanofibers. When a high voltage is applied to an electrospinning solution, which is the second mixture containing a polymer, etc., a jet of the electrospinning solution is extruded from a needle tip. As a result of solvent volatilization, the jet is solidified to form nanofibers with nanometer scale diameters. With the use of electrospinning, it is possible to produce a nanofiber sheet composed of nanofibers having a high specific surface area, porosity, high aspect ratio, and flexibility. Parameters such as fiber diameter, etc. may be easily controlled by controlling spinning conditions.

An electrospinning system for producing the nanowire catalyst precursor may include an electrospinning solution feeder, a high-voltage power supplier, and a collector where nanofibers are collected. In addition, spinning environment (humidity, temperature, etc.) needs to be kept optimal and constant. The electrospinning solution feeder may include a syringe pump and a syringe (or nozzle) for extruding the solution at a constant rate, and may control fiber characteristics depending on the design of the shape, diameter, material, etc. of a syringe needle. The high-voltage power supplier is an insulated cable including a positive (+) pole that charges the electrospinning solution feeder having a high dielectric constant and a negative (−) pole where the charged solution is collected in a nanofiber filament form, and may control voltage and current. The collector where the nanofibers are collected may control the arrangement of nanofiber filaments depending on the design of the shape, movement, speed, etc. thereof, and may have various shapes depending on purpose of use.

Meanwhile, the electrospinning solution used for the electrospinning is generally in a well-dissolved solution state, and may have a great influence on fiber formation depending on solution characteristics of a polymer used during the electrospinning. The solution characteristics include polymer solution concentration, viscosity, surface tension, conductivity, dielectric property, volatility, etc. The polymer solution concentration is closely related to the viscosity. Since the viscosity is a measure of the degree of entanglement and fluidity of polymer chains, it is known as an important factor influencing spinning rate, and the shape and diameter of fibers to be produced during the electrospinning.

In addition, the electrospinning solution may be electrospun at an operating voltage of 15 kV to 30 kV, a spinning rate of 1 ml/hr to 5 ml/hr, and a spinning distance of 20 cm to 40 cm. When the operating voltage is too low, the electrospinning solution fails to be spun into nanofibers but falls in a bead form. On the other hand, when the operating voltage is too high, the electrospinning solution is spun into a spray form rather than a nanofiber form. In addition, when the spinning rate is too slow, electrospinning time is extended. On the other hand, when the spinning rate is too fast, it is difficult to form nanofibers, and nanofiber thickness is increased.

In the step of heat-treating the resultant product resulting from the electrospinning, a nanowire catalyst precursor, which is the resultant product resulting from the electrospinning, is heat-treated to pyrolyze the second polymer precursor to form the first pores. Specifically, the resultant product resulting from the electrospinning may be subjected to a primary heat treatment for pyrolysis, and then a resultant product resulting from the pyrolysis is subjected to a secondary heat treatment for carbonation in a reducing atmosphere.

The primary heat treatment is performed to remove the second polymer precursor, thereby forming the first pores. Specifically, the primary heat treatment may be performed by heating the resultant product resulting from the electrospinning to a temperature of 550° C. to 650° C. in an air atmosphere. When the temperature of the primary heat treatment is too low, the second polymer precursor is not removed, so that pores are not formed. On the other hand, when the temperature thereof is too high, the first polymer precursor is also removed together with the second polymer precursor, so that a nanowire structure is not maintained.

The secondary heat treatment is performed to form an initial product of the nanowire catalyst from the first polymer precursor and the first metal precursor remaining after the primary heat treatment. Specifically, the secondary heat treatment may be performed at a temperature of 200° C. to 300° C. in a reducing atmosphere. In this case, the reducing atmosphere may be a hydrogen atmosphere, a hydrogen/nitrogen atmosphere, or a hydrogen/argon atmosphere. When the temperature of the secondary heat treatment is too low, a metal oxide nanowire rather than a metal nanowire is formed. On the other hand, when the temperature thereof is too high, aggregation between nanowires may occur.

In the step of performing the acid treatment, the initial product of the nanowire catalyst, which is the resultant heat-treated product, is acid-treated to form the second pores from the second metal precursor, thereby forming a final nanowire catalyst.

An acid for the acid treatment may include an acid that can form the second pores from the second metal precursor, e.g., at least one selected from the group consisting of sulfuric acid, nitric acid, formic acid, acetic acid, and hydrochloric acid, but is not limited to including only a specific acid.

In the acid treatment, the number and shape of the second pores may be controlled by controlling acid concentration, treatment time, and the number of treatments. Preferably, the acid treatment is performed with an acid having a concentration of 0.5 M to 1.5 M for one to five times for 30 minutes to 180 minutes. When the concentration of the acid is too low, a second metal is not removed.

On the other hand, a method of producing a nanowire catalyst for a fuel cell according to the present disclosure in order to form second pores and then form first pores includes the steps of: preparing a first mixture by mixing a first polymer precursor, a first metal precursor, and a second solvent in a first solvent, preparing a second mixture by adding a second polymer precursor to the first mixture, electrospinning the second mixture, and heat-treating a resultant product resulting from the electrospinning.

In this case, method of producing the nanowire catalyst for the fuel cell according to the present disclosure in order to form the second pores and then form the first pores may include substantially overlapping contents with the contents regarding the method of producing the nanowire catalyst for the fuel cell in order to form the first pores and then form the second pores, and a duplicate description may be omitted.

In the step of preparing the first mixture, the first mixture is prepared by mixing the first polymer precursor, the first metal precursor, and the second solvent in the first solvent.

In this case, the second solvent is a solvent that can form pores in the subsequent electrospinning step, and may include a solvent having a lower volatilization temperature than the first solvent, e.g., water.

The second solvent may be included in a content of 10% to 25% by weight with respect to the total weight of the solvents. Preferably, the second solvent is included in a content of 15% to 25% by weight. When the content of the second solvent is too small, pores are not formed. On the other hand, when the content of the second solvent is too large, irregular beads may be formed during electrospinning.

The step of electrospinning the second mixture is performed in the same manner as the previously described electrospinning step. With the use of electrospinning as described above, the added second solvent can control the solidification rate due to having a characteristic of volatilizing faster than the first solvent, thereby forming the second pores.

The produced nanowire catalyst for the fuel cell may be used as a catalyst for an electrode used in a fuel cell. Therefore, since the nanowire catalyst for the fuel cell according to the present disclosure has a porous structure in which the first and second pores having predetermined pore sizes are uniformly dispersed inside and on the surface thereof at a predetermined volume ratio, it is possible to enable the efficient exposure of active sites and efficient mass transfer, thereby improving fuel cell performance.

Although the exemplary embodiments of the present disclosure have been described for illustrative purposes, those skilled in the art will appreciate that various modifications, additions, and substitutions are possible, without departing from the scope and spirit of the disclosure as disclosed in the accompanying claims.

The invention claimed is:

1. A nanowire catalyst for a fuel cell, the nanowire catalyst comprising a catalytic metal, and the catalytic metal having a porous structure in which first and second pores having different pore sizes are uniformly dispersed inside and on a surface of the catalytic metal;
    wherein the first pores have a larger pore size than the second pores;
    wherein the first pores account for 10% to 30% by volume and the second pores account for 70% to 90% by volume with respect to the total volume of the pores;
    wherein the first pores have a pore size of 7 nm to 10 nm;
    wherein the second pores have a pore size of 2 nm to 6 nm;
    wherein the catalytic metal has a nanowire structure.

2. The nanowire catalyst of claim 1, wherein the catalytic metal comprises at least one selected from the group consisting of platinum (Pt), palladium (Pd), gold (Au), silver (Ag), and iridium (Ir).

3. The nanowire catalyst of claim 1, wherein the nanowire catalyst has a nanowire diameter of 15 nm to 150 nm.

\* \* \* \* \*